(12) United States Patent
John et al.

(10) Patent No.: US 11,598,445 B2
(45) Date of Patent: Mar. 7, 2023

(54) INFLATION VALVE ASSEMBLY

(71) Applicant: Goodrich Corporation, Charlotte, NC (US)

(72) Inventors: Poly Puthur John, Karnataka (IN); Srijith Purushothaman, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 298 days.

(21) Appl. No.: 16/433,545

(22) Filed: Jun. 6, 2019

(65) Prior Publication Data

US 2020/0326014 A1    Oct. 15, 2020

(30) Foreign Application Priority Data

Apr. 10, 2019  (IN) .............................. 201911014526

(51) Int. Cl.
*F16K 31/42* (2006.01)
*F16K 31/122* (2006.01)

(52) U.S. Cl.
CPC .......... *F16K 31/42* (2013.01); *F16K 31/1223* (2013.01)

(58) Field of Classification Search
None
See application file for complete search history.

(56) References Cited

U.S. PATENT DOCUMENTS

| 4,556,612 | A | 12/1985 | Thibault et al. | |
|---|---|---|---|---|
| 5,390,805 | A | 2/1995 | Bilani et al. | |
| 7,007,715 | B2 * | 3/2006 | Nakayama | H01G 9/12 137/512.4 |
| 8,403,783 | B2 * | 3/2013 | Wigsten | F16H 7/0848 474/110 |
| 2004/0045605 | A1 * | 3/2004 | Floh | B05B 1/086 137/512.15 |
| 2007/0056636 | A1 * | 3/2007 | Cornwell | F16K 15/142 137/535 |
| 2019/0353263 | A1 * | 11/2019 | John | F16K 31/42 |

FOREIGN PATENT DOCUMENTS

| DE | 10232740 A1 * | 2/2004 | ............. F16K 31/42 |
|---|---|---|---|
| DE | 202011003184 U1 * | 6/2011 | ........... F16K 15/142 |

OTHER PUBLICATIONS

Espacenet translation DE 10232740A1, Sep. 2020 (Year: 2020).*
Espacenet translation DE 202011003184, Sep. 2020 (Year: 2020).*

* cited by examiner

Primary Examiner — Daphne M Barry
(74) Attorney, Agent, or Firm — Cantor Colburn LLP

(57) ABSTRACT

An inflation valve and systems for inflating an inflatable device includes a valve. The valve includes an outer body, a command chamber within the outer body and an inlet chamber, the inlet chamber having an inlet connected to the source of inflation gas and an outlet connected to the inflatable device. The valve also includes a vent fluidly connected to the command chamber, the vent including a vent body having one or more vent holes formed therein and an elastomeric sleeve surrounding a portion of the vent body and covering the one or more vent holes.

16 Claims, 4 Drawing Sheets

INFLATION VALVE ASSEMBLY

FOREIGN PRIORITY

This application claims priority to Indian Patent Application No. 201911014526 filed Apr. 10, 2019, the entire contents of which is incorporated herein by reference.

BACKGROUND

Exemplary embodiments pertain to the art of inflation valve assemblies.

Pneumatic inflation systems discharge a high pressure stored gas to inflate an inflatable device. The high pressure stored gas is to be discharged within a specified time by the opening an inflation valve.

In typical operation, the inflation valve is a flow isolation valves actuated by mechanical or electrical means. In many of the platforms inflation valves are operated (e.g., initiated) by electric squib. This electric squib initiator has regulatory issues and feature single shot actuation.

Another approach is to utilize a 2-way solenoid to initiate the inflation valve.

BRIEF DESCRIPTION

In one embodiment, an inflation valve assembly for inflating an inflatable device includes a source of inflation gas and an inflation valve that includes an outer body and two chambers within the outer body, the two chambers including a command chamber and an inlet chamber. The inlet chamber has an inlet connected to the source of inflation gas and an outlet connected to the inflatable device. The assembly also includes a valve operation initiator connected to the source of inflation gas that controls a flow of gas into the command chamber. The valve includes a vent fluidly connected to the command chamber, the vent including a vent body having one or more vent holes formed therein and an elastomeric sleeve surrounding a portion of the vent body and covering the one or more vent holes.

In an assembly according to any prior embodiment, the valve operation initiator is a solenoid valve.

In an assembly according to any prior embodiment, the solenoid valve is a 2-way normally closed solenoid valve.

In an assembly according to any prior embodiment, the elastomeric sleeve is formed of nitrile or ethylene propylene diene methylene (EPDM).

In an assembly according to any prior embodiment, the vent body includes retaining channel formed on an outer surface thereof and the elastomeric sleeve is disposed in the retaining channel.

In an assembly according to any prior embodiment, the assembly further includes a controller configured to receive an inflation signal and cause the valve operation initiator to move from a closed state to an open state upon receipt of the inflation signal.

In an assembly according to any prior embodiment, the controller is configured to cause the valve operation initiator to move from the open state to the closed state after withdrawal of the inflation signal.

In an assembly according to any prior embodiment, the inflation valve include a stem moveable from a first position where gas received at the inlet of the inlet chamber is not allowed to pass through the inlet chamber to the inflatable device and a second position where gas received at the inlet of the inlet chamber is allowed to pass through the inlet chamber to the inflation device.

In an assembly according to any prior embodiment, when the valve operation initiator allows gas to flow into the command chamber, the stem moves into the second position.

In another embodiment, an inflation valve for inflating an inflatable device includes an outer body, a command chamber within the outer body, an inlet chamber, the inlet chamber having an inlet connected to the source of inflation gas and an outlet connected to the inflatable device and a vent fluidly connected to the command chamber, the vent including a vent body having one or more vent holes formed therein and an elastomeric sleeve surrounding a portion of the vent body and covering the one or more vent holes.

In a valve according to any prior embodiment the elastomeric sleeve is formed of nitrile or ethylene propylene diene methylene (EPDM).

In an assembly according to any prior embodiment, the vent body includes retaining channel formed on an outer surface thereof and the elastomeric sleeve is disposed in the retaining channel.

In an assembly according to any prior embodiment, the vent body includes a base and an end portion and the retaining channel is received between the base and an end portion.

In an assembly according to any prior embodiment, an outer diameter of the retaining channel is smaller than an outer diameter of the end portion.

In an assembly according to any prior embodiment, an outer diameter of the retaining channel is larger than an inner diameter of the elastomeric sleeve in its natural state.

In an assembly according to any prior embodiment, the valve further includes a stem moveable from a first position where gas received at the inlet of the inlet chamber is not allowed to pass through the inlet chamber to an inflatable device and a second position where gas received at the inlet of the inlet chamber is allowed to pass through the inlet chamber to the inflation device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As discussed above, on approach to operating a inflation valve is to provide a valve operation initiator such as 2-way solenoid valve to initiate (or otherwise open) the inflation valve. However, it has been discovered that in some instances the solenoid valve can leak.

As discussed further below with respect to FIGS. 1 and 2, gas leaked through the solenoid valve can lead to initiation of the inflation valve. These unintended initiations due to leakage can be reduced or eliminated by embodiments disclosed herein. In one embodiment, the inflation valve includes a vent provided in a command cavity thereof that vents the leaked gas from the command cavity. The vent can include a leak vent elastomeric check valve in one embodiment and that is described more fully below.

The inflation system that includes in inflation valve with a leak vent and an initiation circuit (such as a solenoid) is disclosed herein. The system can be utilized with an inflatable device provided with a vehicle, such as an aircraft. The inflatable device according to one embodiment may be an evacuation slide, raft, or other inflatable structure. The inflatable device may be used for emergency evacuation of the aircraft and is arranged to be packaged within a compartment of the aircraft (i.e. the aircraft door, aircraft frame, a packboard housing inside the fuselage, a slide bustle, etc.). In operation the inflation system for the rapid inflation of the inflatable device from an un-deployed condition to a deployed condition, in which the inflatable device is ready for use, such as flotation or evacuation. Responsive to a request to evacuate the aircraft using the inflatable device, the inflation system utilizes a source of pressurized gas or fluid such as a container or bottle of compressed gas that is suitably mounted relative to the inflatable device to inflate the inflatable device.

Figure 1:
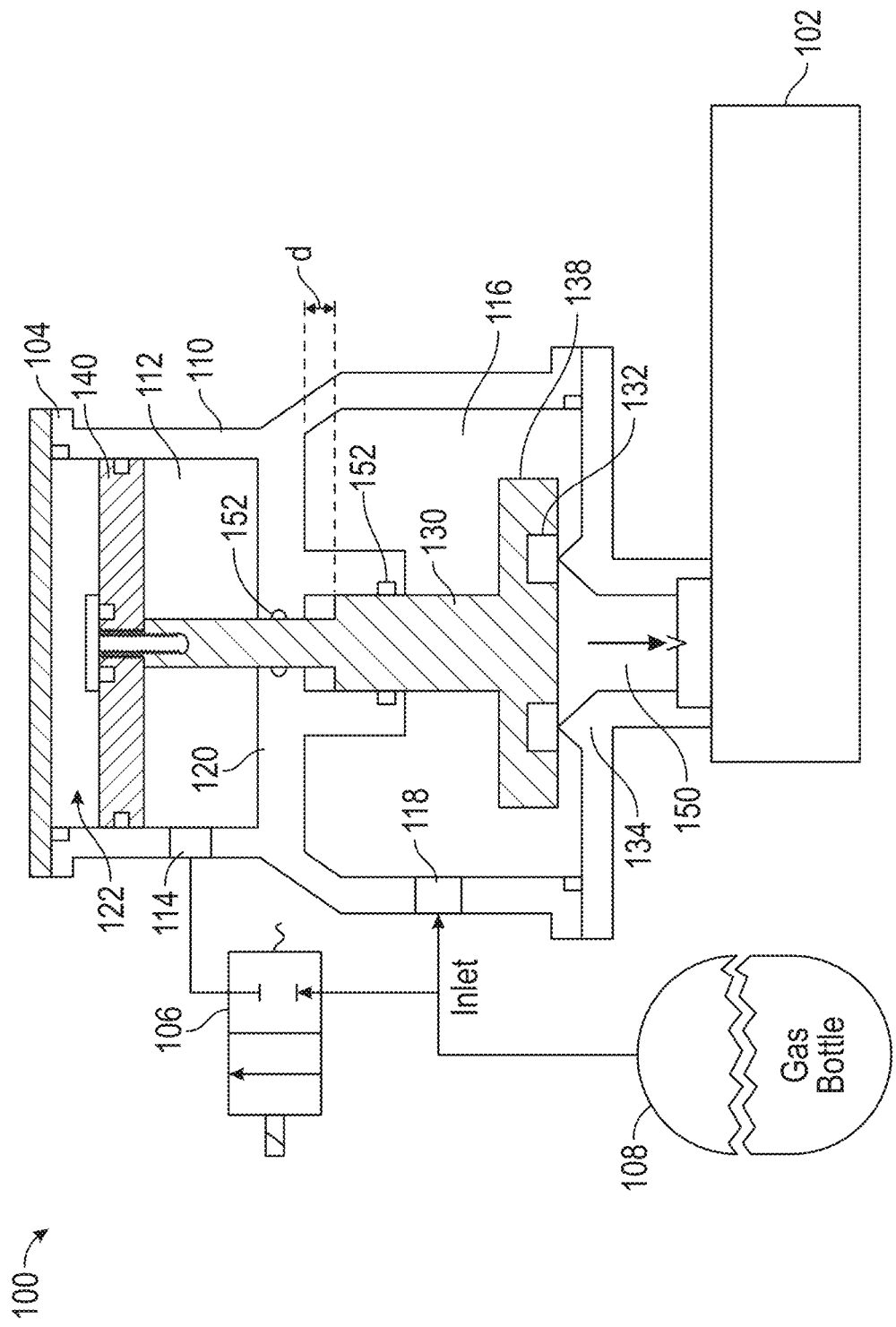
FIG. 1 is a schematic illustration of a prior art inflation valve assembly in a closed position.
Figure 2:
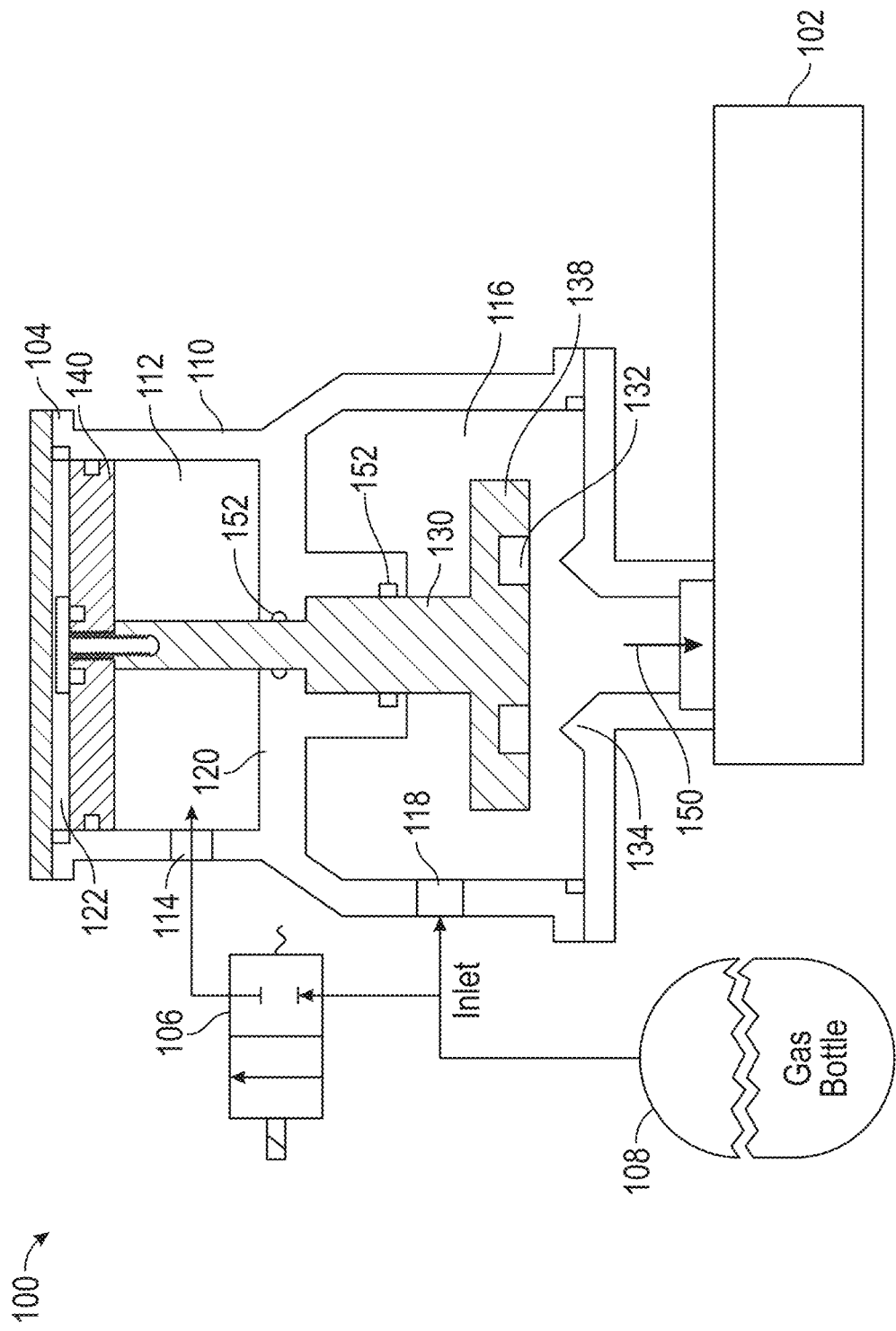
FIG. 2 is a schematic illustration of the prior art inflation valve assembly of FIG. 2 in an open position.

To more fully describe the problem discovered and its solution provided herein, reference is made to FIGS. 1 and 2 that, respectively show an inflation system that does not include a leak vent.

In particular, FIGS. 1 and 2 show an inflation system 100 for inflating an inflatable device 102. The inflation system 100 includes an inflation valve 104 and a valve operation initiator 106. The valve operation initiator 106 can be a 2 way solenoid. In FIG. 1, the valve operation initiator 106 is in the close state and maintains the inflation valve 104 in close state to keep gas from the gas bottle 108 from passing through it into the inflatable device 102. In FIG. 2, the valve operation initiator 106 is in the open state that allows the inflation valve 104 to open and for gas from the gas bottle 108 to pass through the inflation valve outlet 150 into the inflatable device 102.

The illustrated inflation valve 104 includes an outer body 110 that is divided into a two cavities. The first cavity is a command cavity 112 that controls the position of the stem 130. The second cavity is an inlet cavity 116 through which gas from the gas bottle 108 passes into the inflatable device 102 when the inflation valve 102 is open (e.g., as shown in FIG. 2). The two cavities 112, 116 are separated from each other by a divider 120.

The stem 130 can move within the housing 112 such that moves between a closed state (FIG. 1) and an open state (FIG. 2). In FIG. 1 the amount of travel between the closed and open states is indicated by a travel distance d.

The command cavity 112 includes an inlet 114 connected to an output of the valve operation initiator 106. An input to the valve operation initiator 106 is connected to the gas bottle 108. When the valve operation initiator 106 is closed, gas is generally not allowed to pass through it and the pressure in the command cavity 112 is relatively low.

The inlet cavity 116 includes an inlet 118 fluidly connected to the gas bottle 108 and receives gas therefrom in both the open and close states. When the inflation valve 104 is in the closed state, the pressure in the inlet cavity 116 is generally higher than the pressure in the command cavity 112. The pressure in the inlet cavity 116 is exerted on a top side of a sealing end 138 of the stem 130 and causes it to cover the outlet 150 of the inflation valve 104.

In the closed state, the valve operation initiator 106 blocks air from passing from the gas bottle 108 into the command cavity 112. A control end 140 of the stem 130 is disposed within the command cavity 112. As shown, the stem 130 and the sealing end 138 are shown as a unity piece but that is not required. Also, the control end 140 is shown as a separate piece from the stem 130 but could be unitary with it. The control end 140 defines the size of a dummy cavity 122 within the command cavity 112. The dummy cavity 122 gets smaller as the inflation valve 104 opens (i.e., as the stem 130 moves upward.) The stem 130 can be surrounded by one or more seals 152 that allow the movement and seal gas from traveling between the inlet cavity 116 and the command cavity 120. The sealing end 138 can include a valve seal 132 that mates with seat landing 134 to seal the outlet 150 when the inflation valve is in the closed state.

To open the valve and move it from the closed state of FIG. 1 to the open state of FIG. 2, gas is allowed to pass from the gas bottle 108 into the command cavity 120. The valve operation initiator 106 allows this to happen by providing a connection there through between the gas bottle and the inlet 114 to the command cavity 112. The increase in pressure in the command cavity 112 causes an upward from the control end 140 of the stem 130 that causes the stem to move upward and allows gas from the gas bottle 108 to pass through the inlet cavity 116 into the inflatable device 102. The skilled artisan will realize that the relative sizes of the inlet cavity 116 and the command cavity 112 are sized such that movement happens when desired.

As discussed above, the valve operation initiator 106 and the inflation valve 104 together form the inflation valve system. In one embodiment, the valve operation initiator 106 is a normally closed solenoid valve. The valve operation initiator 106, when activated, serves as a so-called "pilot valve" to cause the inflation valve to open as described above. In the initial closed position, the main valve and the pilot valve operation initiator 106 should exhibit extreme leak tightness till actuated for the final inflation use. Though the valve operation initiator 106 will be designed for extremely high internal leak tightness, practically it will have very minor internal leakage. This leaked gas gets filled inside the command cavity 112. Eventually this will result in a pressure rise in the command cavity and can cause an unwanted opening of the inflation valve 104.

Disclosed herein is a manner of reducing or eliminating an undesired pressure rise in the command cavity 112 due to leakage through the valve operation initiator 106.

Figure 3:
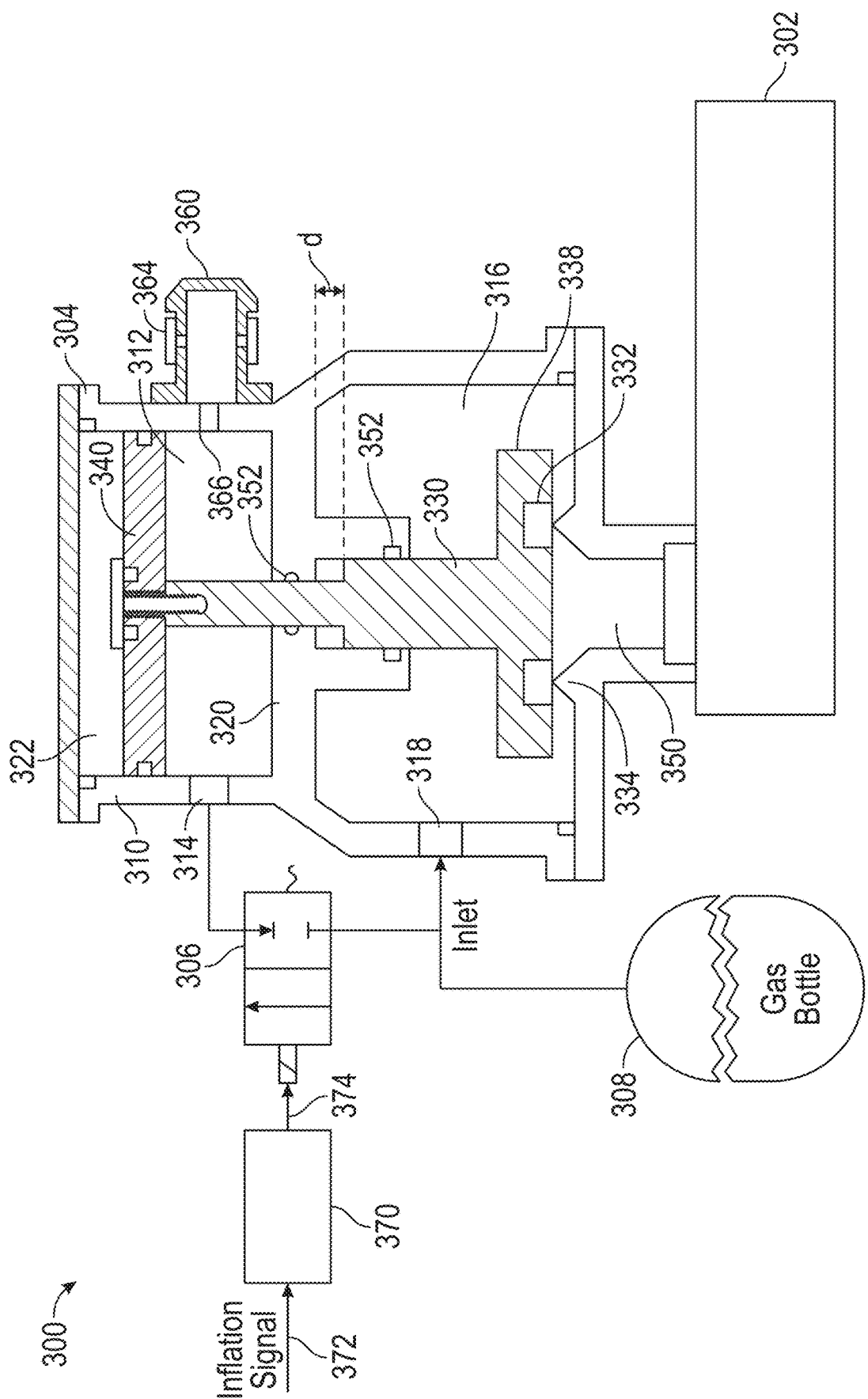
FIG. 3 is a schematic illustration of the inflation valve assembly in an closed position with leak vent feature added.

In one embodiment, and as shown in FIG. 3, this pressure rise inside the command cavity 112 can be avoided by the continuous venting of the leaked gas to an ambient environment through a vent 360. This leak venting to an ambient environment will not adversely affect the functioning of inflation valve 304. This vent 360 should prevent the ingress of water or other moisture and/or solid external contaminants from the external ambient environment. To meet these continuous leak venting and the ingress prevention requirements, the vent 360 can be implemented as an elastomeric check valve that includes a vent port 362 (see FIGS. 4a and 4b) that is covered by an elastomeric sleeve 364. The vent 360 can be fitted to a prior inflation valve 104 on FIG. 1 such that it is in fluid communication with the command cavity.

The following discussion refers to FIG. 3. The inflation system 300 shown in FIG. 3 works generally in the same manner as described above and moves from the closed state to the open state based upon when the valve operation initiator 306 operation. The valve operation initiator 306 is a solenoid valve in one embodiment. The solenoid valve is a normally closed 2-way solenoid valve in one embodiment.

The inflation system 300 includes an inflation valve 304 and a valve operation initiator 306 that control whether gas from gas bottle 308 can enter an inflatable device 302. The inflatable device 302 may be an evacuation slide, raft, or other inflatable structure.

The valve operation initiator 306 can be a 2-way solenoid valve in one embodiment.

In FIG. 3, the valve operation initiator 306 is in the closed state and maintains the inflation valve 304 in a closed state to keep gas from the gas bottle 308 from passing through it into the inflatable device 302.

The illustrated inflation valve 304 includes an outer body 310 that is divided into a two cavities. The first cavity is a command cavity 312 that controls the position of the stem 330. The second cavity is an inlet cavity 316 through which gas from the gas bottle 308 passes into the inflatable device 302 when the inflation valve 302 is open (e.g., as shown in FIG. 2). The two cavities 312, 316 are separated from each other by a divider 320.

The stem 330 can move within the housing 312 such that moves between a closed state as shown and an open state. In FIG. 3 the amount of travel between the closed and open states is indicated by a travel distance d.

The command cavity 312 includes an inlet 314 connected to an output of the valve operation initiator 306. The inflation system 300 includes a controller 370. The controller 370 receives an inflation signal 372 that can be created when, for example, a door or other cover to the inflatable device 302 is opened indicating that the inflatable device 302 is to be opened. When the controller receives the inflation signal the controller 370 signals the valve operation initiator 306 to move to the open state and allow gas from the gas bottle 308 or other gas source to flow into the command cavity 312 to open the inflation device 304.

An input to the valve operation initiator 306 is connected to the gas bottle 308. In the closed state, the valve operation initiator 306 blocks air from passing from the gas bottle 308 into the command cavity 312. As such, when the valve operation initiator 306 is closed, the pressure in the command cavity 312 is relatively low. However, in the event such gas does enter the command cavity 312 through the valve operation initiator 306 when it is in the close state, that gas needs to be vented. As such, a vent 360 is fluidly connected to the command cavity 312 via a command cavity outlet 366 that passes through the outer body 310 of the inflation valve 302. This vent 360 is described further below.

The inlet cavity 316 includes an inlet 318 fluidly connected to the gas bottle 308 and receives gas therefrom in both the open and close states. When the inflation valve 304 is in the closed state, the pressure in the inlet cavity 316 is generally higher than the pressure in the command cavity 312. The pressure in the inlet cavity 316 is exerted on a top side of a sealing end 338 of the step 330 and causes it to cover the outlet 350 of the inflation valve 304.

A control end 340 of the stem 330 is disposed within the command cavity 312. As shown, the stem 330 and the sealing end 338 are shown as a unity piece but that is not required. Also, the control end 340 is shown as a separate piece from the stem 330 but could be unitary with it. The control end 340 defines the size of a dummy cavity 322 within the command cavity 312. The dummy cavity 322 gets smaller as the inflation valve 304 opens (i.e., as the stem 330 moves upward.) The step 330 can be surrounded by one or more seals 352 that allow the movement and seal gas from traveling between the inlet cavity 316 and the command cavity 320. The sealing end 338 can include a valve seal 332 that mates with seat landing 334 to seal the outlet 350 when the inflation valve is in the closed state.

To open the valve and move it from the closed state to the open state gas is allowed to pass from the gas bottle 308 into the command cavity 320. The valve operation initiator 306 allows this to happen by providing a connection there through between the gas bottle and the inlet 314 to the command cavity 312. As discussed above, the controller 370 controls opening of the valve operation initiator 306 based on an inflation signal 372. The increase in pressure in the command cavity 312 causes an upward from the control end 340 of the stem 330 that causes the stem to move upward and allows gas from the gas bottle 308 to pass through the inlet cavity 316 into the inflatable device 302. The skilled artisan will realize that the relative sizes of the inlet cavity 316 and the command cavity 312 are sized such that movement happens when desired.

Figure 4A:
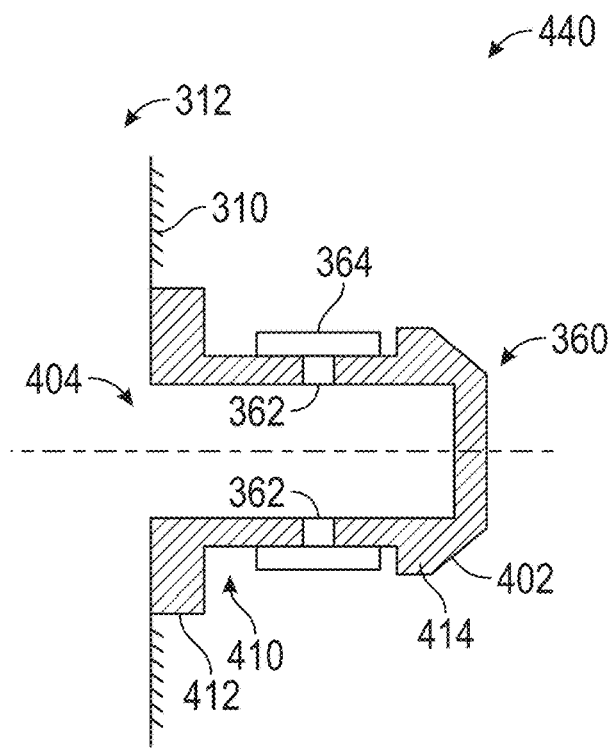
FIGS. 4*a* and 4*b* show a cross section of a leak vent on an inflation valve according to one embodiment that illustrate the leak vent in closed and open states, respectively.
Figure 4B:
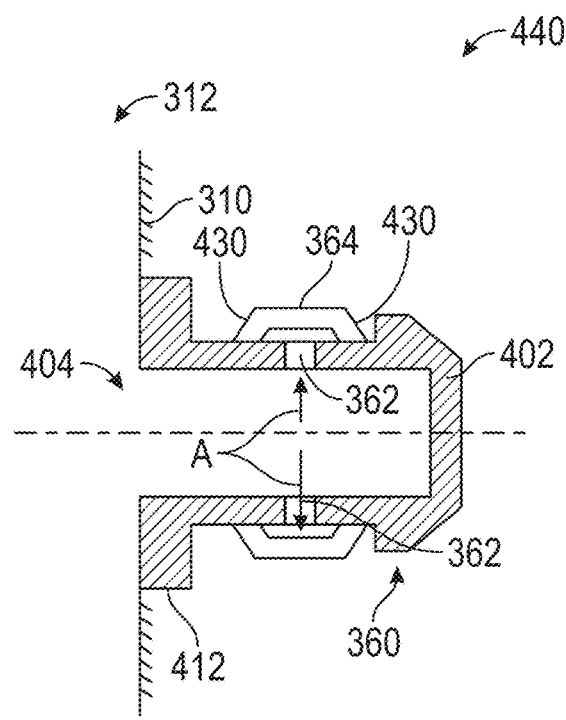

As best seen in FIGS. 4a and 4b, when the vent 360 is connected to or formed on the outer body 310 such that it extends outwardly therefrom and is fluidly connected to the command cavity 312. The fluid connection can be made by through the command cavity outlet 366 best seen in FIG. 3. The command cavity outlet 366 passes through the outer body 310.

Referring again to FIGS. 4a and 4b, the vent 360 includes a vent body 402 that defines a vent volume 404 within it. In normal operation, gas leaked into the command cavity 312 will be able to enter the vent volume 404. The vent body 402 includes one or more vent ports 362 passing it. An elastomeric sleeve 364 surrounds the vent body 402 such that it covers or is in close proximity to the vent ports 362. When the pressure is below a threshold the elastomeric sleeve 364 is compressed on the vent body 402 such that gas in the vent volume 404 cannot exit the vent 360 as shown in FIG. 4a. When the pressure is above the threshold the elastomeric sleeve 364 is expanded away from the vent body 402 near the vent ports 362 such that gas in the vent volume 404 can exit the vent 360 as indicated by arrows A shown in FIG. 4b. The vent body 402 can be formed of metal and can be tubular in shape. The vent ports 362 include two radial opposed ports as illustrated in FIGS. 4a and 4b in one embodiment.

The vent body 402 can include retaining channel 410 defined between the a base 412 and an end portion 414 of the vent body 402. The outer diameter of the retaining channel 410 is smaller than the outer diameter of the end portion 414 in one embodiment. To assemble the vent 360, the elastomeric sleeve 364 is stretched slightly so that it can be passed over the end portion 414 and located in the retaining channel 410.

After installation, the elastomeric sleeve 364 is retained in the retaining channel 410. The inner diameter of the retaining sleeve 364 in it "un-stretched" or "natural" state is smaller than the outer diameter of the retaining channel 410 in one embodiment. As shown in the 4a, the elastomeric sleeve 364 being stretched provides the sealing force to make the vent ports 362 leak tight to isolate the vent volume 404 from the surrounding ambient environment 440. As such, the elastomeric sleeve 364 can serve to keep water or other contaminants out of the vent volume 404.

The elastomeric sleeve 364 can be formed of materials such as nitrile or ethylene propylene diene methylene (EPDM). The material selected should be compatible to the gas in the gas bottle 308 and the operating temperature range in the ambient environment 440. Of course, the material properties, elastomeric sleeve dimensions and the initial stretch decides the initial sealing force and should be lower than the force in the command cavity 312 which will cause the inflation valve to open.

In the system assembly as illustrated in FIG. 3 and with further reference to FIGS. 4a and 4b, gas leaked though the leaked gas from the valve operation initiation 306 will pass into the vent volume 404 of the vent body 402. Accumulation of this leaked gas eventually develops fluid pressure higher than in ambient environment 440. This increased pressure starts to radially push out the elastomeric sleeve 364 causing is deflect radially as shown in FIG. 4b. This radial deflection increases with pressure build up. As shown in FIG. 4b, this increased deflection eventually develops narrow gaps 430 at the interface with vent body 402 through which gas can be discharged to the ambient environment 404.

Once pressure gets discharged, the elastomeric sleeve 364 contracts back to the configuration shown in FIG. 4a. In this manner this elastomeric sleeve 364 operates as a check valve to vent the leaked gas to ambient environment 440 and to prevent the ingress of external media.

When the inflation valve 304 is actuated to inflate of the inflatable device 302, the valve operation initiator 306 is opened and gas pressure builds up inside the command cavity 312. This pressure builds up inside the command cavity 312 to move the stem 330 and open the outlet 350. After this initial opening, the position of the stem 330 will be sustained by the resultant fluid pressure force inside the inlet cavity 316. At this time, valve operation initiator 306 can be closed by the controller 370 to cut off gas flow into the command chamber 312. This can happen based on a time delay or after the inflation signal is withdrawn. Of course, the high pressure in the command cavity 312 as the valve operation initiator 306 is in the open state may deform the elastomeric sleeve beyond the elastic limit and gas flow outage to the ambient environment 440 can happen. By closing the valve operation initiator 306, the this flow outage will be stopped. Hence the gas loss through this vent port is eliminated by the closing of valve operation initiator 306.

In some instances, the elastomeric sleeve 364 can be subjected to environmental degradation should be replaced. Also, after inflation, the elastomeric sleeve 364 may lose resilience and need to be replaced.

Based on the above, the skilled artisan will realize that the system just described can provide one or more advantages over the prior art. For example, the vent 360 with elastomeric sleeve 364 can provide a simple check valve to vent leaked gas to ambient. This leak venting action involves radial deflection of the sleeve with pressure rise inside the command cavity. Ultimately this radial deflection of sleeve increases and develops narrow flow gaps at the interfacing region with fitting body. The leaked gas then will be vented out to ambient through these gaps. The initial stretch of sleeve in the assembly provides the sealing force to prevent the ingress of external media. The top side of the fitting body can be easily shaped to insert the elastomeric sleeve within the cylindrical slot of the fitting body. Since it is retained within cylindrical slot, the degradation due to environmental effects is minimized.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A valve assembly for inflating an inflatable device, the assembly comprising:
   a source of inflation gas;
   an inflation valve that includes an outer body and two chambers within the outer body, the two chambers including a command chamber and an inlet chamber, the inlet chamber having an inlet connected to the source of inflation gas and an outlet connected to the inflatable device; and
   a valve operation initiator connected to the source of inflation gas that controls a flow of gas into the command chamber;
   wherein the inflation valve includes a vent fluidly connected to the command chamber and extending outwardly from the outer body, the vent including a vent body having one or more vent holes formed in the vent body and an elastomeric sleeve surrounding a portion of the vent body and covering the one or more vent holes.

2. The system of claim 1, wherein the valve operation initiator is a solenoid valve.

3. The system of claim 2, wherein the solenoid valve is a 2-way normally closed solenoid valve.

4. The system of claim 1, wherein the elastomeric sleeve is formed of nitrile or ethylene propylene diene methylene (EPDM).

5. The system of claim 1, wherein the vent body includes retaining channel formed on an outer surface of the vent body and the elastomeric sleeve is disposed in the retaining channel.

6. The system of claim 1, further including a controller, the controller configured to receive an inflation signal and cause the valve operation initiator to move from a closed state to an open state upon receipt of the inflation signal.

7. The system of claim 6, wherein the controller is configured to cause the valve operation initiator to move from the open state to the closed state after withdrawal of the inflation signal.

8. The system of claim 1, wherein the inflation valve include a stem moveable from a first position where gas received at the inlet of the inlet chamber is not allowed to pass through the inlet chamber to the inflatable device and a second position where gas received at the inlet of the inlet chamber is allowed to pass through the inlet chamber to the inflation device.

9. The system of claim 8, wherein when the valve operation initiator allows gas to flow into the command chamber, the stem moves into the second position.

10. An inflation valve for inflating an inflatable device, the valve comprising:
   an outer body;
   a command chamber within the outer body;
   an inlet chamber, the inlet chamber having an inlet connected to the source of inflation gas and an outlet connected to the inflatable device; and
   a vent fluidly connected to the command chamber and extending outwardly from the outer body, the vent including a vent body having one or more vent holes formed in the vent body and an elastomeric sleeve surrounding a portion of the vent body and covering the one or more vent holes.

11. The valve of claim 10, wherein the elastomeric sleeve is formed of nitrile or ethylene propylene diene methylene (EPDM).

12. The valve of claim 10, wherein the vent body includes retaining channel formed on an outer surface of the vent body and the elastomeric sleeve is disposed in the retaining channel.

13. The valve of claim 12, wherein the vent body includes a base and an end portion and the retaining channel is received between the base and an end portion.

14. The valve of claim 13, wherein an outer diameter of the retaining channel is smaller than an outer diameter of the end portion.

15. The valve of claim 13, wherein an outer diameter of the retaining channel is larger than an inner diameter of the elastomeric sleeve in its natural state.

16. The valve of claim 10, further comprising:
   a stem moveable from a first position where gas received at the inlet of the inlet chamber is not allowed to pass through the inlet chamber to an inflatable device and a second position where gas received at the inlet of the inlet chamber is allowed to pass through the inlet chamber to the inflation device.

* * * * *